July 23, 1963  E. G. CAFLISCH ETAL  3,098,689
INTEGRAL RECORDING
Filed Dec. 13, 1960  4 Sheets-Sheet 1

INVENTORS
EDWARD G. CAFLISCH
FREDERICK A. LORY
THOMAS P. WILSON
BY Howard K Kothe
ATTORNEY

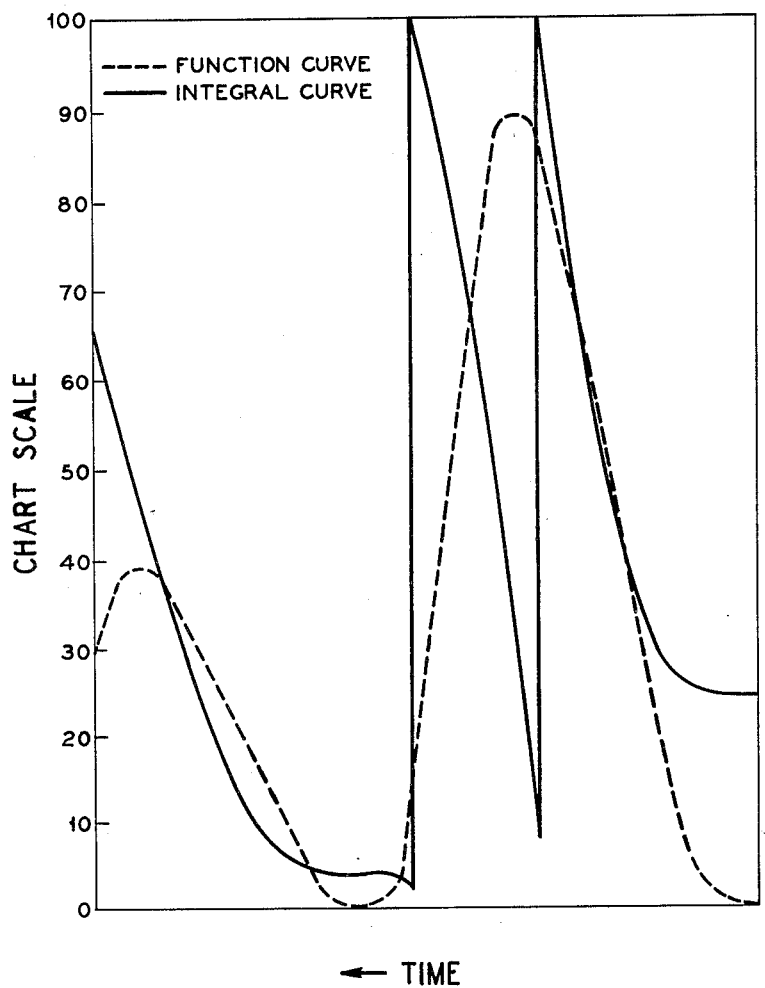

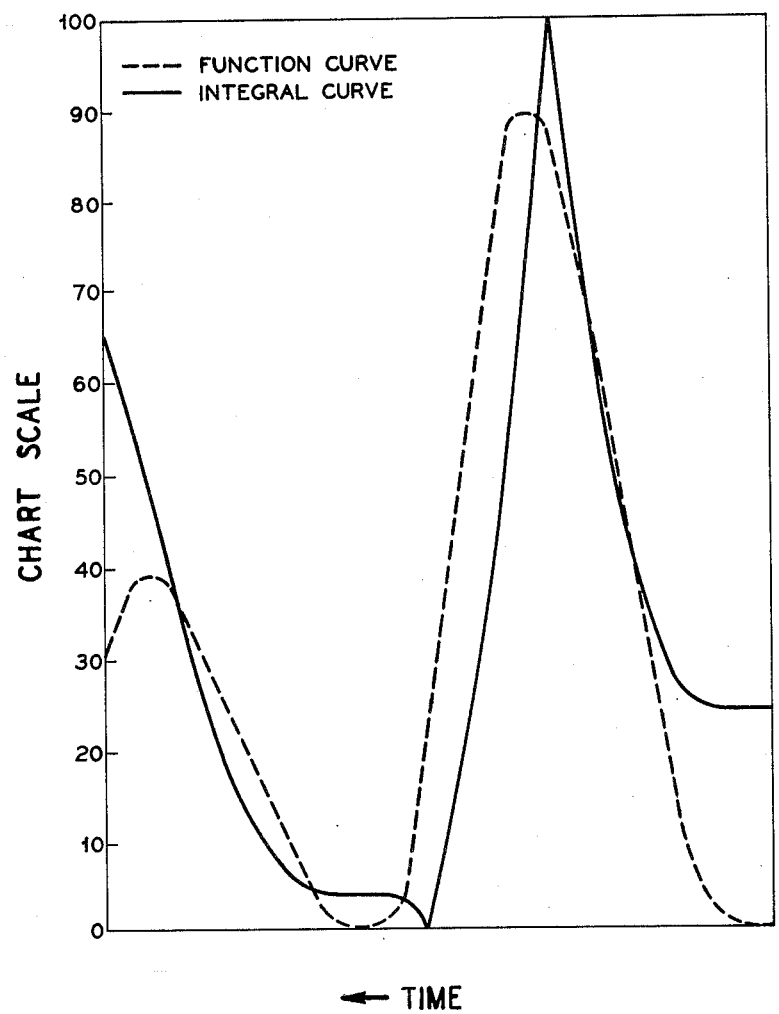

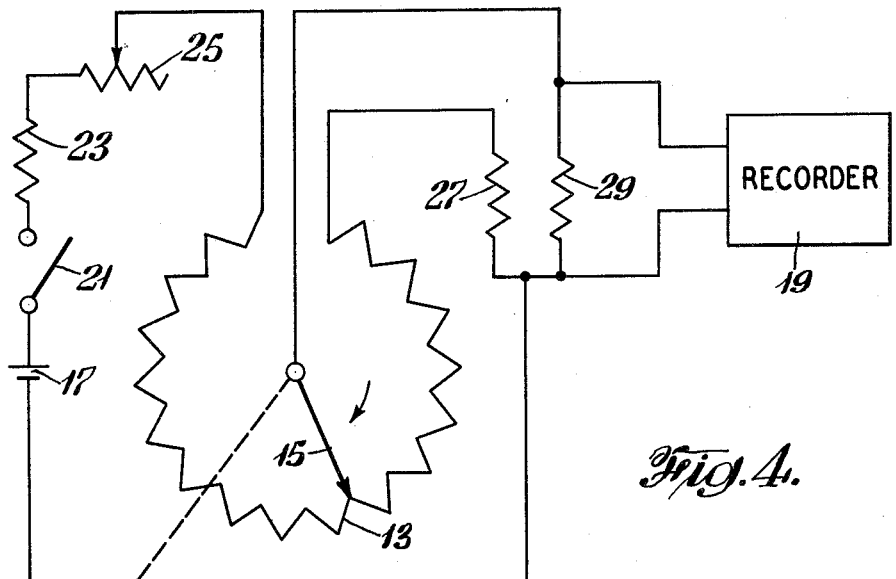
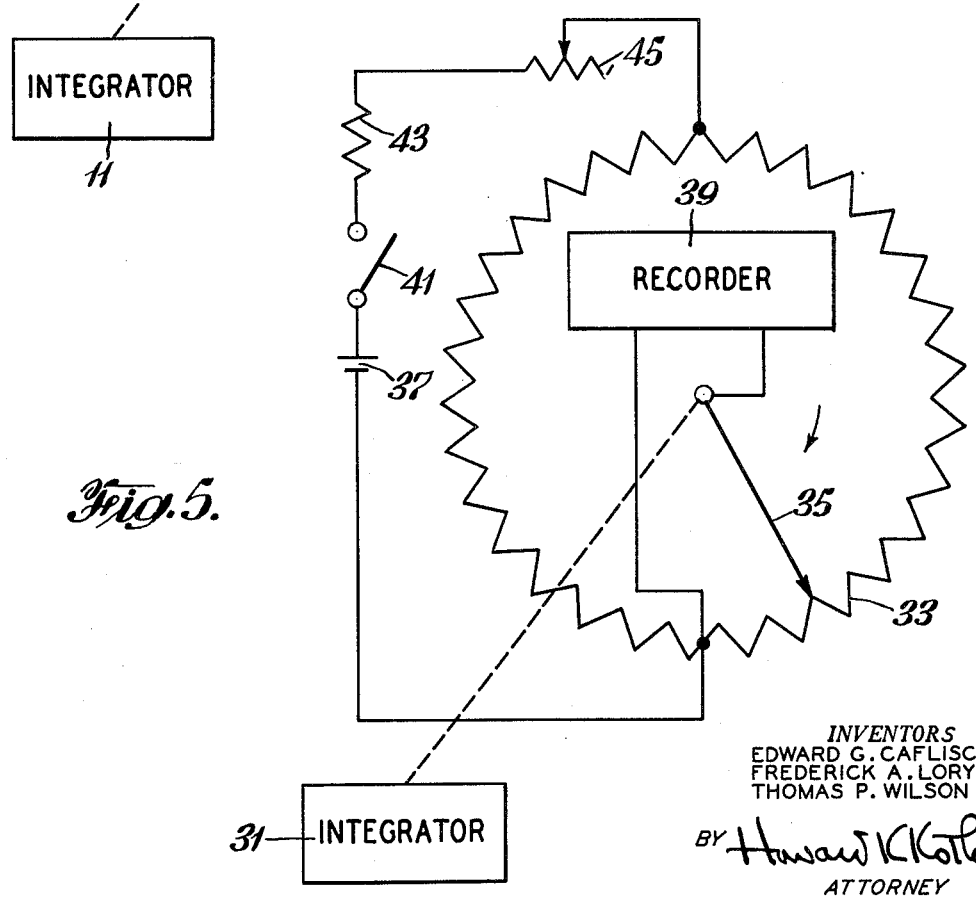

United States Patent Office 3,098,689
Patented July 23, 1963

3,098,689
INTEGRAL RECORDING
Edward G. Caflisch and Frederick A. Lory, South Charleston, and Thomas P. Wilson, Charleston, W. Va., assignors to Union Carbide Corporation, a corporation of New York
Filed Dec. 13, 1960, Ser. No. 75,585
2 Claims. (Cl. 346—49)

The present invention relates to a method of and apparatus for continuously or continually recording the integral, $\int f(x)dx$, of a function $f(x)$ being traced on a strip chart recorder and more particularly to such a method and apparatus adapted for tracing a curve representing said integral on the same recorder chart and simultaneously with the production on said recorder chart of a curve representing the function being integrated. The method of and apparatus for the present invention are especially useful in automatic integration of curves produced by gas chromatography analyzers and similar analyzers which employ continuous amplitude vs. time type data readouts.

Gas chromatographs, also known as vapor phase fractometers, are representative of the type analyzers with which our invention operates successfully. In a typical gas chromatographic system, multicomponent gas or vapor samples are successively introduced into a stream of carrier gas, such as helium, and are flushed through an analyzer column which is packed with inert particles coated with a low vapor-pressure liquid, such as a silicone. Each component in the sample has a different adsorption affinity for the packing material in the column. The component of the sample having the lowest adsorption coefficient will be eluted from the analyzer column first and the component with the highest adsorption coefficient for the coated packing material will be eluted last. This results in the effective separation of the various components of the multi-component sample and the components issue from the column in bands, each in binary mixture with the ocntinuously flowing carrier gas. Detection and quantitative measurement of each of the components of the sample is accomplished by including one thermally sensitive electrical element in the carrier gas stream for a reference cell and another such element in the stream of binary mixtures for a measurement cell. Variations in the thermally sensitive element of the measuring cell are caused by variations in thermal conductivity of the successive bands of binary mixtures eluted from the column as they pass over the element. The thermally sensitive elements which comprise the reference and measuring cells are connected to form two arms of an electrical bridge circuit whose output signals are a measure of the difference between the thermal conductivity properties of the reference and binary mixture streams and may therefore be interpreted as the percent by volume concentration of the components of interest in the binary mixtures. The bridge output signals are voltage waveforms which are usually applied as input signals to a strip chart recorder or recording potentiometer to produce a succession of waveform peaks, each of which corresponds to a component of the sample analyzed, along a time abscissa.

As a relatively new analytical tool, gas chromatography has reduced the time required for many analyses to the point that the actual process of fractionation of components in a mixture being studied often requires less time than the interpretation of the results obtained. As each component is eluted from the analyzer column in binary mixture with the carrier gas, a voltage peak against time is automatically recorded on a strip chart on the analyzer readout device. Quantitative interpretation of the recorded output data of such analyzers is based on the correlation of either peak heights or areas (i.e., area bounded by the waveform trace and the recorder chart base line) with respective concentrations of components in the sample volume analyzed. While peak height measurement is the simpler of the two techniques, area measurement has been found to be more reproducible and more linearly related to concentration of the component represented by the peak. The area under a curve representing any function $f(x)$ corresponds to the definite integral of that function between two abscissal limits in accordance with the conventional expression $$\int_{x_1}^{x_2} f(x)dx$$

In addition to the field of gas chromatography, other analysis procedures in the chemical and related arts frequently require the integration of curves. Fundamental theories of mathematics provide the most exact integration methods for curve functions of the lower exponential orders. Complex and high order functions, however, frequently require relatively ponderous computations. For the simple as well as the complex functions, several known approximate methods of integration yield results of sufficient accuracy for the needs of analysts. Most elementary of the approximate methods of integration is that wherein a particular curve to be integrated is superposed on a set of rectilinear coordinates and the area under the curve is computed approximately by counting squares, or, more accurately, by the use of a planimeter. Other approximate integration methods include Simpson's rule, expansion of the curve function into a converging power series followed by term by term integration and summation and the method using the Coradi mechanical integraph which provides a means of drawing the curve $y=\int f(x)dx$ when the curve $y'=f(x)$ is given. Whether based upon an exact or an approximate method, integration which can be performed automatically rather than by human computation can save analysts many hours of time.

Automatic integral measurement can be accomplished by any one of several commercially available mechanical, electromechanical or electronic integrators. Known integrators can be adapted to yield readouts in various forms such as direct numerical indication, pulseform constant amplitude signals and waveform voltage signals having amplitudes proportional to the integrals of the curves being integrated.

The technique most frequently used in the prior art utilizes pulseform constant amplitude signals from an integrator to make a series of marks called pips along the edge of the chart paper on which the function $f(x)$ being integrated is recorded. The pips are generated by any of several commercially available integrators in such a way that the number of pips occurring between any two abscissal limits is proportional to and therefore representative of the integral of the function $f(x)$ for those particular limits. Two disadvantages experienced with this method are that the pips must be counted by an analyst and that accuracy is limited by the response characteristics of the integrator, i.e., a very rapid rate of change in the function $f(x)$ may exceed the capacity of the integrator to produce enough pips to represent the integral during that change. Enlargement of every tenth pip has been used to facilitate counting but, even with this modification, results have been found to be less than satisfactory, particularly on the occurrence of closely spaced sharp peaks.

Integrators yielding direct numerical indication, i.e. digital readout, are also widely used. Most such integrators require reading by an analyst and manual recording of the number indicated. Some, however, automatically stamp the integral value on a tape either periodically or when the function curve goes through a minimum point. This type of integrator may also be adapted to stamp numerical integral values on the chart on which the function curve is being produced. Accuracy depends on stamping the integral value at the precise abscissa value to which the integral relates and subjective interpretation and correlation of results by an analyst with attendant possibilities of human error makes for limitation of the applicability of this method.

Another integral recording method involves adapting a commercially available integrator to drive a recorder chart at speeds which vary proportionally with the integral of the function being traced by the recorder pen, rather than having the chart driven at constant speed in the conventional manner. This type recording is called an intergram and the width of the recorded peak at the base is a function of the integral of the conventional amplitude vs. time peak. Since the chart paper moves only during occurrence of a peak, and then at a speed proportional to the peak height and function rate of change, a disadvantage of this method is that the usual abscissal time reference is lost.

From the above discussion it will be obvious that none of the known integral recording systems and no combinations thereof yields completely satisfactory results. It will also be obvious that an integral recording method and apparatus which continually automatically records a trace representing the integral $\int f(x)dx$ of a function $f(x)$ being traced on a strip chart recorder simultaneously with the production of the function trace and on the same chart, to produce a record which is easily understood, highly accurate, quickly read, permanent and independent of subjective interpretation, and this with only minimum modification of conventional equipment, fulfills a great need in the analytical arts and represents an outstanding advance over known methods and apparatus.

In general, the apparatus and method of our invention comprise a two-pen strip chart recorder having one pen driven to produce a function curve and the second pen driven to produce an integral curve of the function. A novel electrical circuit is used to convert the rotational speed of an integrator into varying electrical potential for the second recorder pen drive. Our invention can be used with any mechanical or electro-mechanical integrator which can be adapted to drive a rotational potentiometer. The electrical circuitry is such that the second (i.e., integral) pen can be made to traverse the width of the strip chart any number of times to record integrals of the highest and longest duration function peaks within the capacity of the recorder.

With the foregoing and other features in view, which shall more fully hereinafter appear, our invention comprises novel constructions, combinations and arrangements of components as will now be described in detail and as defined in the appended claims and illustrated in the accompanying drawings, in which:

FIGURE 2 is a reproduction of a section of a strip chart showing traces of a function and its integral produced according to a first embodiment of the present invention;

FIGURE 3 is a reproduction of a section of a strip chart showing traces of a function and its integral produced according to a second embodiment of the present invention;

FIGURE 4 is a schematic-diagrammatic presentation of a first embodiment of the apparatus of the present invention and FIGURE 5 is a schematic-diagrammatic presentation of a second embodiment of the apparatus of the present invention.

Figure 1:
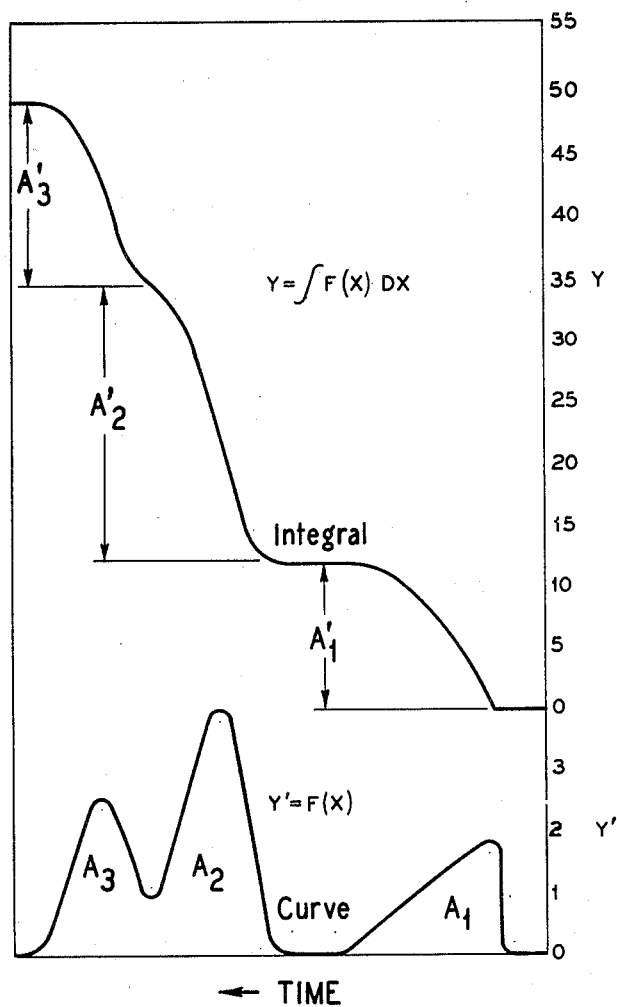
FIGURE 1 is a graph showing traces of a function $y'=f(x)$ and the integral of the function $y=\int f(x)dx$ on the same rectilinear coordinates.

FIGURE 1 of the drawings shows a data record of a curve of a function $y'=f(x)$ and a curve of the function's integral $y=\int f(x)dx$ traced on a set of rectilinear coordinates having a dual ordinate scale. On such a data record the integral of any peak, as well as the peak integral summation, can be readily ascertained. Those skilled in the art will appreciate, however, that an integral recording system to produce such a data readout will suffer severe practical limitations. For example, special strip chart paper would be required to suit each application. Also, in any given application, a peak of unusual height or duration would cause the integral tracing pen of the recorder to run off scale. These difficulties are obviated by the method and apparatus comprising our invention wherein a function curve and its integral curve are traced on standard strip chart paper having a single ordinate scale by any commercially available two-pen recording instrument. Charts produced by first and second embodiments of the apparatus of the present invention are shown respectively in FIGURES 2 and 3 of the drawings.

According to the principle of operation of the first embodiment of apparatus comprising our invention, a first pen of a two-pen recorder traces a conventional signal amplitude vs. time curve representing a function and the second pen of the recorder traces a curve representing the integral of the function in a series of upward traverses along the ordinate scale, dropping towards zero each time the maximum ordinate scale value is reached. The integral for the function curve between any two abscissa limits is obtained by adding the scalar ordinate traverses of the integral curve between the same abscissa limits. Thus, to determine the relative integral of the higher peak of the function curve shown in FIGURE 2 of the drawings, integral curve ordinate digital values of 76 (traverse from 24 to 100), 100 (full scale traverse) and 3.7 (traverse from 0 to ordinate at which integral curve flattens out) are added to obtain 179.7 which number is proportional to the area under said higher peak. In a similar manner, the relative integral for that portion shown of the lower peak of the function curve in FIGURE 2, the integral curve value is seen to be determined by part of a single upward traverse of the integral recording pen, having the value 62.3 (from 3.7 to 66). In this embodiment, each time the integral recording pen reaches full scale it is quickly returned towards scalar zero and the curve is then continued from a new reference point to produce the integral trace form shown in FIGURE 2. It should be noted that, in this first embodiment, the integral pen, after reaching the full scale ordinate value, may not always return all the way to zero because of limitation of the pen's return speed. This phenomenon, however, does not affect the accuracy of the overall integration for any peak and poses a problem requiring some degree of interpretation by analysts only when a dip between two close peaks occurs as the pen is returning towards scale zero.

The incomplete zero-return is avoided altogether in the second embodiment of apparatus comprising our invention whereby the integral curve being traced by the recorder second pen is reversed each time it reaches either end of the ordinate scale. FIGURE 3 of the drawings illustrates the form of data record produced by this second embodiment. According to the principle governing the operation of this second embodiment of our invention, the ordinate scalar distances of the downward as well as the upward traverses of the recorder second or integral pen are added to obtain a relative integral value. Thus, to determine the relative integral of the higher peak of the function curve shown in FIGURE 3 of the drawings, integral curve ordinate values of 76 (traverse from 24 to 100), 100 (full scale downward traverse) and 3.7 (traverse from 0 to ordinate at which integral curve flattens out) are added to obtain 179.7 which number is proportional to the area under said higher peak. The integral curve for the smaller peak, since it traverses only part of the scale upwardly, yields the same relative integral 62.3 (from 3.7 to 66) as in the first embodiment.

It will be obvious that the curves produced according to either embodiment can be readily manually replotted, should occasion require, to make a data graph according to FIGURE 1 of the drawings.

FIGURE 4 of the drawings illustrate diagrammatically and schematically apparatus and circuitry comprising the first embodiment of the present invention. A standard integrator 11 is operably connected to a wiping contact arm 15 of a rotary-type continuous rotation discontinuous winding potentiometer 13. Potentiometer 13 is connected between a constant potential source 17 and an integral recording pen drive on a recorder 19, in circuit with a control switch 21, fixed voltage dropping resistor 23, variable voltage dropping resistor 25, compensating resistor 27 and shunt resistor 29. Voltage dropping resistors 23 and 25 are used in adjusting the potential at the high potential end of the potentiometer 13 winding to effect an exact full scale deflection of the integral recording pen on recorder 19 when wiping arm 15 is at said high potential end. Compensating resistor 27 is used to compensate for the missing degrees of rotation between the high potential and low potential ends of the winding of potentiometer 13. Shunt resistor 29 is used as a field damper across the windings of the integral recorder pen driving motor to effect a rapid return of the pen towards recorder chart scalar zero when the potentiometer wiping arm leaves the high potential end of the potentiometer 13 winding.

In the above-described first embodiment, an electromechanical Instron integrator, Model No. A80, manufactured by the Instron Engineering Corporation, Quincy, Mass., is used to drive wiping arm 15 of potentiometer 13 in a clockwise direction as shown in FIGURE 4 of the drawings. The mechanical coupling between the Instron integrator and the potentiometer wiping arm is arranged to provide one complete potentiometer wiping arm revolution for every 1500 counts of the integrator counter dial. The maximum speed of the Instron integrator used is 5000 counts per minute. A standard laboratory type two-pen strip chart recording potentiometer is used as recorder 19. As a signal representing a function to be integrated is applied to integrator 11, the integrator counter dial rotates, driving potentiometer wiping arm 15 clockwise from the low potential end of the potentiometer 13 winding towards the high potential end. At the end of a complete winding traverse, the potential applied to the integral recorder pen drive will have been steadily increased to the point of full scale pen deflection, at which time wiping arm 15 breaks contact with the last turn of the potentiometer winding, instantly reducing the pen driving potential to zero. The pen returns toward chart scalar zero very rapidly, with the pen driving motor field decaying through shunt resistor 29. Clockwise rotation of the wiping arm continues, at a speed proportional to the integral being recorded and the arm contacts the low potential end of the potentiometer 13 winding, reapplying an increasing potential to the integral recording pen drive motor which causes the integral trace to be resumed.

Apparatus and circuitry comprising the second embodiment of our invention are shown diagrammatically and schematically in FIGURE 5 of the drawings. In this second embodiment, a standard integrator 31 is operably connected to a wiping contact arm 35 of a rotary-type continuous rotation continuous winding potentiometer 33 which has two external connection taps on the continuous winding spaced 180° apart. Potentiometer 33 is connected between a constant potential source 37 and an integral recording pen drive on a recorder 39, in circuit with a control switch 41, fixed voltage dropping resistor 43 and variable voltage dropping resistor 45. Voltage dropping resistors 43 and 45 are used in adjusting the potential at the high potential external connection tap of the potentiometer 33 winding to effect an exact full scale deflection of the integral recording pen on recorder 39 when wiping arm 35 is at said high potential tap. Since, in this second embodiment, potentiometer 33 has a full 360° winding, no compensating resistor similar to that used in the above-described first embodiment is required and, since the integral recording pen of recorder 39 always has a driving potential applied to it, unlike the pen of recorder 19 of the first embodiment which returns automatically towards zero during the time its driving potential is removed, a shunt resistor similar to shunt resistor 29 used in the first embodiment is not required. An integrator, mechanical coupling between the integrator and the potentiometer wiping arm and a recorder similar to those described in the discussion of the first embodiment are arranged according to FIGURE 5 of the drawings. As a signal representing a function to be integrated is applied to integrator 31, the integrator counter dial rotates, driving potentiometer wiping arm 35 clockwise from the low potential external connection tap of the potentiometer 33 winding towards the high potential tap. At the end of 180° of rotational movement, the potential applied to the integral recorder pen drive will have been steadily increased to the point of full scale pen deflection. Upon passing through the 180° point on the potentiometer winding, wiping arm 35 begins applying a steadily decreasing potential to the integral recording pen driving motor, causing a reversal of the pen traverse on the recorder chart and a return towards recorder chart scalar zero, which is reached when the wiping arm 35 reattains its initial zero potential tap position on the potentiometer 33 winding. As the wiping arm passes through the low potential tap, the integral trace is again reversed and begins another upscale traverse of the chart. In this manner, clockwise rotation of the wiping arm continues, at a speed proportional to the integral being recorded, with the arm alternately applying increasing and decreasing potential to the integral recording pen drive motor to produce an integral record similar to that shown in FIGURE 3 of the drawings.

Other than the requirements that shunt resistor 29 of the first embodiment be of an ohmic value which will not affect the linearity of potentiometer 13, that in both embodiments the potentiometer selected have high precision and high linearity and that the various components are selected for proper coordinated operation, there are no limitations imposed on the adaption of the apparatus of our invention. Those skilled in the art will readily see many possible modifications to and adaptions of our invention. Resistance values can be varied widely, the maxima depending mainly on the input impedance of the recorder employed and the minima on the current capacity of the system components and the potential source used. The speed ratio of the mechanical coupling between the integrator and the potentiometer wiping arm can be varied, being limited by pen speed at one extreme and accuracy requirements at the other. While a two-pen recorder is most desirable in producing a record which readily identifies a function with its integral, two single-pen recorders can be used successfully and the charts can be brought into abscissal register for comparison of the function and the integral curves. In those applications where an integral curve only is required, one single-pen recorder can be used. Since an integral is in itself a function, it will be apparent to those skilled in the art that our invention can be used to record variable functions should occasion arise to do so. Although, as shown on the drawings, the apparatus comprising our invention is shown energized by a D.C. potential source, both embodiments are readily adaptable to operation on an A.C. potential source. The selection and application of numerous equivalents, which, combined, will comprise apparatus according to the present invention will undoubtedly be suggested by our description to persons familiar with the art. While the method and apparatus of our invention were developed for use with, and have hereinabove been described with reference to, gas chromatograph analyzers, the method and apparatus are equally applicable to recording the integration of any function.

While, in the foregoing description, certain specific details and operative steps have been set forth, together with certain suggested modification, additional variations may be made in these without departing from the spirit of the present invention. The foregoing description has been given for clearness of understanding only, and no unnecessary limitations should be understood therefrom.

What is claimed is:

1. A system for recording the integral of a variable function, said system comprising, in combination, an integrator having a component which moves at a rate proportional to the rate of change of the integral of a variable function being integrated; a recorder adapted to produce graphic representations on coordinate axes by means of a controllably moveable pen, said pen being controllably moveable by and responsive to input voltage signals applied to said recorder; a rotary type continuous rotation potentiometer having a rotor operably connected to and continuously repeatedly driven by said integrator from a low potential position through increasing potential positions to a high potential position and from said high potential position through a zero potential position to said low potential position at a rate proportional to the rate of change of the integral of a variable function being integrated to produce a varying potential signal continually proportional to the integral of said variable function; a potential source and electrical circuitry connecting said potential source, said potentiometer and said recorder, said electrical circuitry comprising a first conductor connecting one side of the potential source to the high potential position on the potentiometer, a second conductor connecting the rotor to a first input terminal of the recorder, a third conductor connecting the other side of the potential source to a second input terminal of the recorder and a fourth conductor connecting the low potential position on the potentiometer to said second input terminal of the recorder whereby the varying potential signal produced in said potentiometer is applied to said recorder.

2. A system for recording the integral of a variable function, said system comprising, in combination, an integrator having a component which moves at a rate proportional to the rate of change of the integral of a variable function being integrated; a recorder adapted to produce graphic representations on coordinate axes by means of a controllably moveable pen, said pen being controllably moveable by and responsive to input voltage signals applied to said recorder; a rotary-type continuous rotation potentiometer having a rotor operably connected to and continuously repeatedly driven by said integrator from a low potential position through increasing potential positions to a high potential position and from said high potential position through decreasing potential positions to said low potential position at a rate proportional to the rate of change of the integral of a variable function being integrated to produce a varying potential signal continuously proportional to the integral of said variable function; a potential source and electrical circuitry connecting said potential source, said potentiometer and said recorder, said electrical circuitry comprising a first conductor connecting one side of the potential source to the high potential position on the potentiometer, a second conductor connecting the rotor to a first input terminal of the recorder, a third conductor connecting the other side of the potential source to the low potential position on the potentiometer and a fourth conductor connecting the low potential position on the potentiometer to a second input terminal of the recorder whereby the varying potential signal produced in said potentiometer is applied to said recorder.

References Cited in the file of this patent

UNITED STATES PATENTS

| | | |
|---|---|---|
| 1,784,522 | Harrison | Dec. 9, 1930 |
| 2,661,260 | Salzman | Dec. 1, 1953 |
| 2,960,378 | Wickerham | Nov. 15, 1960 |